UNITED STATES PATENT OFFICE.

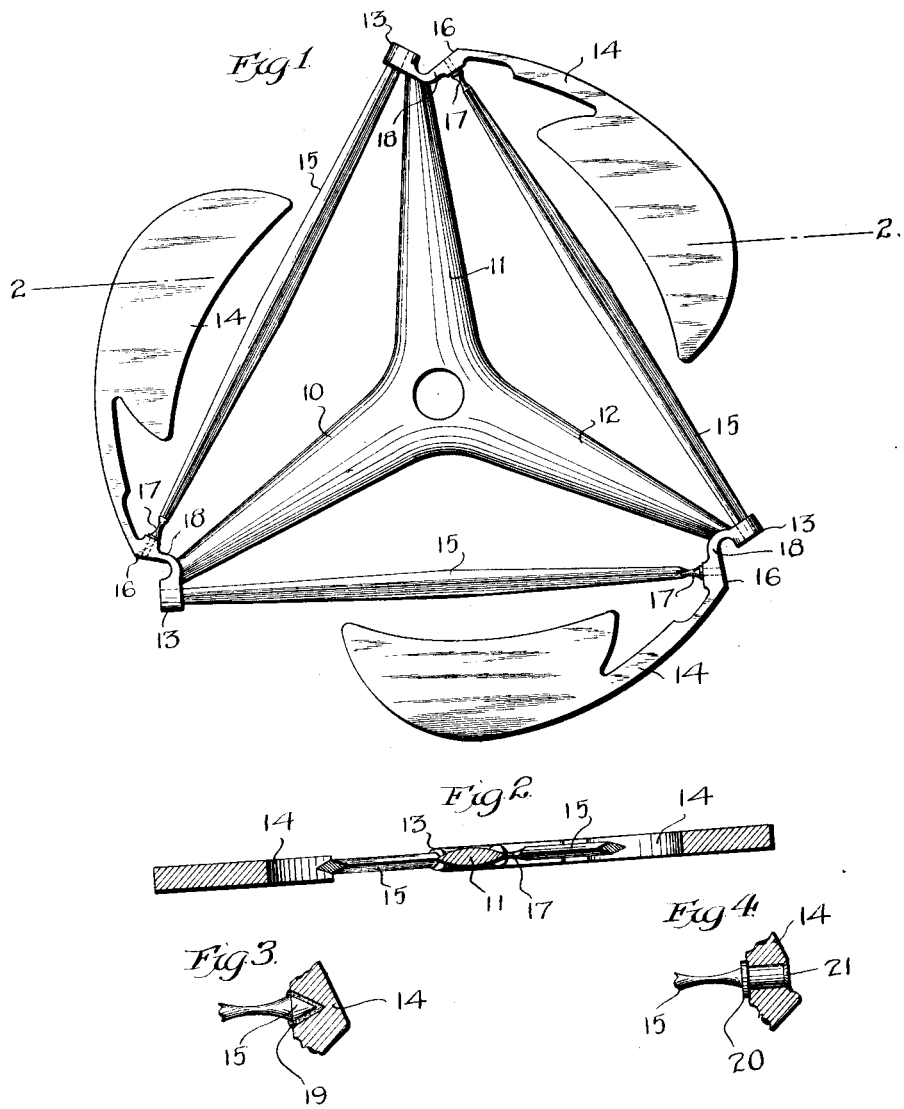

FREDERIC ECAUBERT, OF BROOKLYN, NEW YORK.

COMPENSATING BALANCE-WHEEL.

1,176,527.  Specification of Letters Patent.  Patented Mar. 21, 1916.

Application filed February 11, 1914. Serial No. 818,061.

*To all whom it may concern:*

Be it known that I, FREDERIC ECAUBERT, a citizen of the United States, residing in the borough of Brooklyn, county of Kings, State of New York, have invented certain new and useful Improvements in Compensating Balance-Wheels, of which the following is a full and clear specification.

My invention relates in general to balance wheels and more particularly to those which are provided with means for compensating for expansion and contraction due to change of temperature.

In my prior U. S. Patent No. 965,505, issued July 26th, 1910, I have shown and described a compensating balance wheel in which differential expansion and contraction of two members is employed to control the radius of oscillation of weighted arms so as to compensate for the temperature changes. In this prior patent the weighted arms are under tension and thereby hold in place the otherwise loosely mounted compensating member which is in the form of a glass rod or the like and forms a strut which bears against the resilient, weighted arm of the balance wheel.

The present invention has for its object to improve the construction set forth in said prior patent and to provide a slightly different and more positive control of the weighted arms. To this end, according to the present improvement, the loosely mounted glass rods or the like which form struts for opposing the inward spring of the weighted arms, are substituted by positively fixed rods which exert tension as well as compression upon the weighted arms, which latter are no longer resilient, but are positively actuated in both directions by the control members.

It will be apparent that under the general principle of the invention, the details of construction may vary considerably. The wheel center, for example, may be of skeleton form, of spoked construction, or solid, whereas the control members may be fixed to the weighted arms in any suitable manner, as by soldering, threading, riveting, clamping or the like. The weighted arms may be integral with or suitably united to the wheel center. Preferably, however, I provide a spoked construction for the wheel center, from which the weighted arms project integrally, and the control members are mounted between the outer ends of adjacent spokes and are positively secured at one end to a stud or boss projecting from one spoke and at the other end are positively secured to an intermediate portion of the weighted arm, as by solder.

An embodiment of the invention is illustrated in the accompanying drawing, in which—

Figure 1 is a front elevation of the compensating balance wheel; Fig. 2 is a transverse section thereof on the line 2—2, Fig. 1; Fig. 3 is a detail sectional view of the soldered union of the control member with the weighted arm, and Fig. 4 is a detail sectional view of the riveted or upset connection of the control member with the weighted arm.

Referring more specifically to said drawing, the wheel center is illustrated as comprising the spokes 10, 11, 12, from the ends of which project the studs 13 and weighted arms 14, which are preferably integral with the wheel center. The weighted arms 14 extend in a general circumferential direction in balanced relation about a common axis of oscillation and have curved free ends to provide automatic adjustment of their distance from the center under variations in pressure or resistance, which they encounter during the oscillation of the balance wheel. The wheel center and the weighted arms may be constructed of any suitable material as, for example, phosphor bronze. Rigidly fixed in the studs 13, are the control members 15, which are preferably in the form of bars or rods of suitable stiffness and strength to perform the function which will hereinafter appear. The control members 15 may be constructed of any suitable material having a different co-efficient of expansion from the material of the wheel center, as, for example, ferro nickel. At the other end, the control members 15 are rigidly fixed to an intermediate point 16 of the weighted arms 14. The control members 15 are attenuated or weakened at the point 17, near the rigid union with the weighted arms, and the weighted arms are attenuated at 18, between the spokes of the wheel center and the union of the control member with the intermediate point of the weighted arm. By this construction variation of the triangle formed by each control member with the two adjacent spokes is permitted without strain or deformation at other parts, the length of the control member being such that only a negligible tendency to alter the angle of the control member with the spoke at the seat 13 being transmitted thereby. It is, therefore, ordinarily unnecessary to provide a weakened or attenuated point at the end of control member 15 which is fixed in seat 13.

The particular method of securing the control members in the seats 13 and weighted arms 14 may be varied without departing from the principles of my invention, which require only that the connection of the control members with the seats and weighted arms be positive and secure, so as to enable the control members to perform the functions which will now be described.

In operation it will be understood that the balance wheel oscillates under the influence of the hair spring or the like, and that the weighted arms 14 tend to move outward by centrifugal force. The resistance of the air in the path of the weighted arms, operating against the curved ends thereof, tends to control the position of the free ends of the arms so as to automatically adjust the operation to suit variations in pressure or density of gas encountered. With variations in temperature, the wheel center 10, 11, 12, expands more than the members 15, so that the inner ends of the weighted arms tend to move outward, whereas the control members 15, being connected to the weighted arms at an intermediate point between the inner ends and the outer weighted ends of the arms, deflect or bend inward the weighted arms thus maintaining the proper distance of the weights from the common center of oscillation. When the wheel center contracts, due to reduction in temperature, the control members 15 exert a pressure against the weighted arms, thus again maintaining them in proper position.

In order for the control members 15 to exert tension it is necessary, as above stated, to have them secured or positively fixed to the seats 13 and the weighted arms 14. Figs. 3 and 4 illustrate two examples of union. In Fig. 3 the weighted arm 14, for example, is provided with a recess in which is disposed the suitably formed end of the control member 15, with a layer of solder 19. Preferably a hard solder, such as silver solder, or the like, is employed for this purpose. In Fig. 4, the control member 15 is shouldered at 20 and the end of the control member passes through a perforation in the weighted arm 14 and is upset therein as indicated at 21.

With the construction illustrated it will be seen that the entire balance wheel is substantially a unitary structure integral throughout, so that none of the parts can become displaced from their points of connection.

The hard solder connection of the control members results in a unitary integral structure with no play or backlash and permits of the application of heavy pressure to the otherwise finished article to increase the elasticity and resistance to injury.

The three spoke construction herein shown and described, is a preferred form of the invention in view of the more perfect balance thereby obtained, regardless of position and the bracing action of the control members.

I claim:

1. A compensating balance wheel comprising in combination a wheel center, weighted arms projecting therefrom in balanced relation about a common axis of oscillation, and control members rigidly fixed at an intermediate point of said weighted arms.

2. A compensating balance wheel comprising in combination a wheel center, weighted arms projecting therefrom in balanced relation about a common axis of oscillation, and a control member of different co-efficient of expansion from said wheel center, suitably fixed at one end and rigidly fixed at the other end to an intermediate point of each of said weighted arms.

3. A compensating balance wheel comprising in combination a wheel center, weighted arms and lugs integral with and projecting from said wheel center in balanced relation about a common axis of oscillation, and control members of different co-efficient of expansion from said wheel center, secured at one end in said lugs and at the other end rigidly fixed to an intermediate point of said weighted arms.

4. A compensating balance wheel comprising in combination a wheel center, weighted arms projecting therefrom in balanced relation about a common axis of oscillation, suitably secured control members positively fixed to an intermediate point of said weighted arms, said weighted arms being attenuated between such intermediate point and the wheel center and said control members being attenuated adjacent to their connection to said weighted arms.

5. A compensating balance wheel comprising in combination a wheel center, weighted arms projecting therefrom in balanced relation about a common axis of oscillation, suitably secured control members of different co-efficient of expansion from said wheel center positively fixed to an intermediate point of said weighted arms, said weighted arms being attenuated between such intermediate point and the wheel center and said control members being attenuated adjacent to their connection to said weighted arms.

6. A compensating balance wheel comprising in combination a wheel center, lugs and weighted arms integral therewith and projecting in balanced relation about a common axis of oscillation, control members of different co-efficient of expansion from said wheel center, soldered to and rigid with said lugs and an intermediate point of said weighted arms.

7. A compensating balance wheel comprising in combination a wheel center formed of three spokes, lugs and weighted arms projecting from the outer ends of said spokes in balanced relation about a common axis of oscillation, and control members of different co-efficient of expansion from said center, secured at one end in said lugs and at the other end rigidly fixed to an intermediate point of said weighted arms.

FREDERIC ECAUBERT.

Witnesses:
　Wm. A. Courtland,
　Octavius Knight.

Copies of this patent may be obtained for five cents each, by addressing the "Commissioner of Patents, Washington, D. C."